(12) United States Patent
Rofougaran

(10) Patent No.: US 7,949,366 B2
(45) Date of Patent: *May 24, 2011

(54) DIVERSITY RECEIVER SYSTEM WITH INTERFERENCE CANCELLATION AND METHODS FOR USE THEREWITH

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 772 days.

This patent is subject to a terminal disclaimer.

(21) Appl. No.: 11/947,018

(22) Filed: Nov. 29, 2007

(65) Prior Publication Data

US 2009/0143041 A1    Jun. 4, 2009

(51) Int. Cl.
*H04M 1/00* (2006.01)
*H04B 17/02* (2006.01)

(52) U.S. Cl. ............... 455/552.1; 455/132; 455/135; 455/136; 455/232.1; 455/233.1

(58) Field of Classification Search ............... 455/277.1, 455/500–501, 63.1, 67.13, 130–139, 230, 455/246.1, 278.1, 283, 284, 296, 552.1, 232.1, 455/233.1, 101, 234.1, 234.2, 236.1, 240.1, 455/247.1, 249.1, 250.1, 254, 241.1
See application file for complete search history.

(56) References Cited

U.S. PATENT DOCUMENTS

| | | | | |
|---|---|---|---|---|
| 2004/0198421 | A1* | 10/2004 | Coan | 455/552.1 |
| 2006/0233224 | A1* | 10/2006 | Lotter et al. | 375/148 |
| 2007/0110135 | A1* | 5/2007 | Guess et al. | 375/148 |
| 2007/0183483 | A1* | 8/2007 | Narayan et al. | 375/148 |
| 2007/0280338 | A1* | 12/2007 | Haub et al. | 375/222 |
| 2009/0141776 | A1* | 6/2009 | Roberts et al. | 375/148 |
| 2010/0111141 | A1* | 5/2010 | Currivan et al. | 375/144 |
| 2010/0150279 | A1* | 6/2010 | Arar | 375/340 |
| 2010/0177857 | A1* | 7/2010 | Huttunen et al. | 375/350 |
| 2010/0208774 | A1* | 8/2010 | Guess et al. | 375/148 |

* cited by examiner

*Primary Examiner* — Pablo N Tran

(74) *Attorney, Agent, or Firm* — Garlick Harrison & Markison; Bruce E. Stuckman

(57) ABSTRACT

A diversity receiver includes a first radio frequency (RF) receiver section receives a first inbound RF signal over a range of frequencies and generates a first amplified RF signal, wherein the first inbound RF signal includes a desired RF signal component and an undesired signal component. A second RF receiver section receives a second inbound RF signal over the range of frequencies and generates a second amplified RF signal, wherein the second inbound RF signal includes the desired signal component and the undesired signal component. A first RF cancellation module generates a desired RF signal from the desired RF signal component while attenuating the undesired signal component, based on the first amplified RF signal and the second amplified RF signal.

17 Claims, 9 Drawing Sheets

DIVERSITY RECEIVER SYSTEM WITH INTERFERENCE CANCELLATION AND METHODS FOR USE THEREWITH

CROSS-REFERENCE TO RELATED APPLICATIONS

None

BACKGROUND OF THE INVENTION

1. Technical Field of the Invention

This invention relates generally to wireless communications systems and more particularly to radio transceivers used within such wireless communication systems.

2. Description of Related Art

Communication systems are known to support wireless and wire line communications between wireless and/or wire line communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system or a particular RF frequency for some systems) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage. The low noise amplifier (LNA) receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

For a receiver to reliably recover data from received inbound RF signals it must be able to isolate desired signal components of the inbound RF signals from interferers (e.g., interference from adjacent channel(s), interference from other devices and/or systems using frequencies near the frequency band of interest, and/or transmission blocking signals that occur in RFID systems). For example, in a cellular system, it is fairly common to have significant nearby interferers of the frequency band of interest (e.g., one or more desired channel(s) of 5-60 MHz centered at a frequency of about 900 MHz, 1800 MHz, 1900 MHz, and/or 2100 MHz) that adversely affect the ability of a receiver to accurately recover data.

One solution to reduce the adverse affects caused by interferers is to use an off-chip band pass filter (BPF) prior to the LNA to attenuate the interferers and pass the desired channel(s). However, with nearby interferers (e.g., within 100 MHz), the BPF needs a steep roll off to sufficiently attenuate the interferers making it an expensive part. In addition, an off-chip BPF typically reduces the magnitude of the desired channel(s) by about 3 dB.

Another solution is to use a less expensive BPF with less roll off. While this reduces the cost and the attenuation of the desired channel(s), it does not sufficiently attenuate large nearby interferers.

Therefore, a need exists for a radio receiver and RF front end that sufficiently attenuated interferers without the use of costly BPFs and with negligible attenuation of the desired channel(s).

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
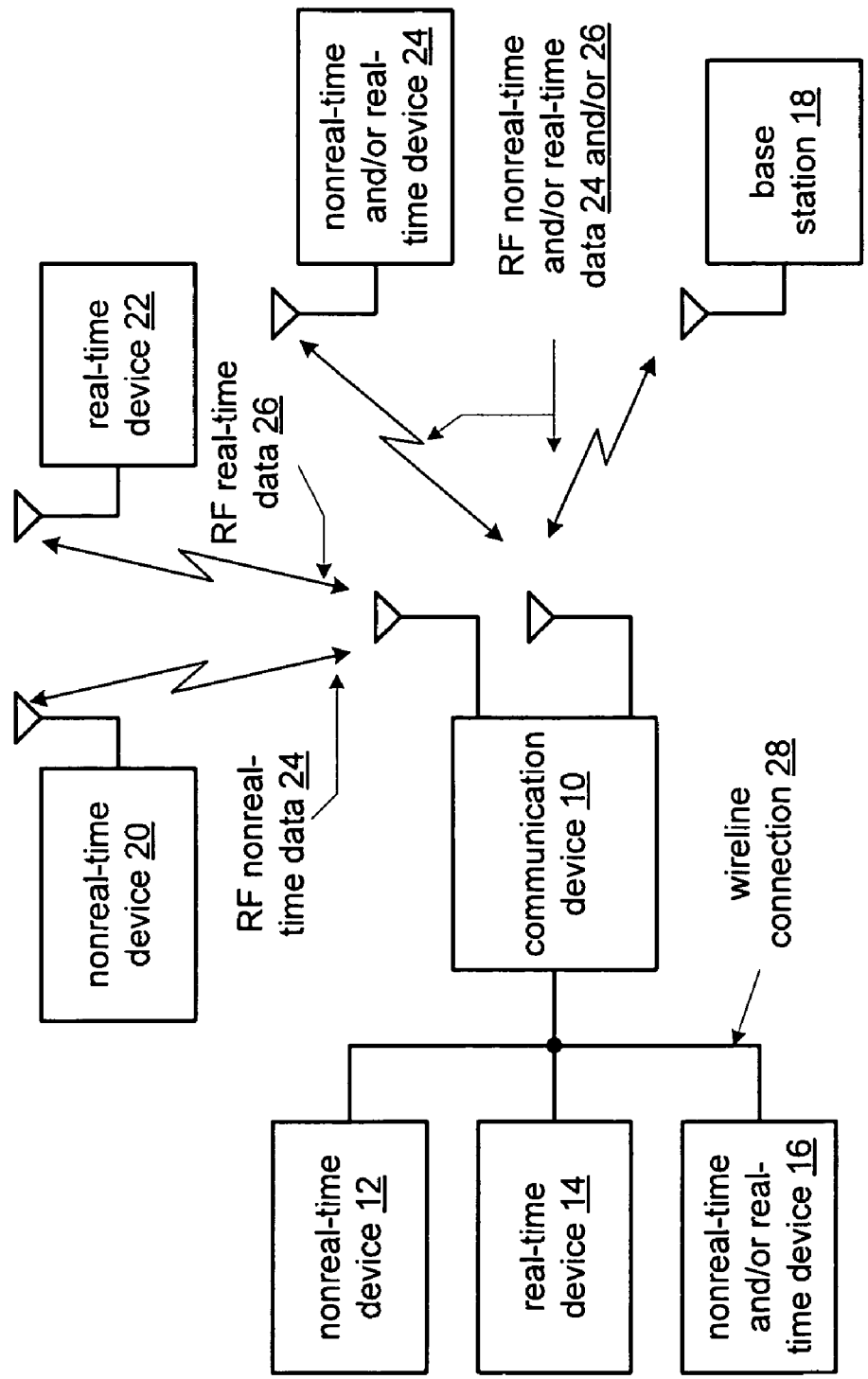
FIG. 1 is a schematic block diagram of a wireless communication system in accordance with the present invention.

FIG. 1 is a schematic block diagram of an embodiment of a communication system in accordance with the present invention. In particular, a communication system is shown that includes a communication device 10 that uses a diversity receiver or transceiver communicates real-time data 24 and/or non-real-time data 26 wirelessly with one or more other devices such as base station 18, non-real-time device 20, real-time device 22, and non-real-time and/or real-time device 24. In addition, communication device 10 can also optionally communicate over a wireline connection with non-real-time device 12, real-time device 14 and non-real-time and/or real-time device 16.

In an embodiment of the present invention the wireline connection 28 can be a wired connection that operates in accordance with one or more standard protocols, such as a universal serial bus (USB), Institute of Electrical and Electronics Engineers (IEEE) 488, IEEE 1394 (Firewire), Ethernet, small computer system interface (SCSI), serial or parallel advanced technology attachment (SATA or PATA), or other wired communication protocol, either standard or proprietary. The wireless connection includes a wireless communications path implemented by a wireless transceiver of communication device 10 that operates in accordance with a wireless network protocols such as IEEE 802.11, Bluetooth, Ultra-Wideband (UWB), WIMAX, or other wireless network protocol, a wireless telephony data/voice protocol such as Global System for Mobile Communications (GSM), General Packet Radio Service (GPRS), Enhanced Data Rates for Global Evolution (EDGE), Personal Communication Services (PCS), or other mobile wireless protocol or other wireless communication protocol, either standard or proprietary. Further, the wireless communication paths can include separate transmit and receive paths that use separate carrier frequencies and/or separate frequency channels. Alternatively, a single frequency or frequency channel can be used to bi-directionally communicate data to and from the communication device 10 for each communication path.

Communication device 10 can be a mobile phone such as a cellular telephone, a personal digital assistant, game console, personal computer, laptop computer, or other device that performs one or more functions that include communication of voice and/or data via wireline connection 28 and/or the wireless communication paths. In an embodiment of the present invention, the real-time and non-real-time devices 12, 14 16, 18, 20, 22 and 24 can be personal computers, laptops, PDAs, mobile phones, such as cellular telephones, devices equipped with wireless local area network or Bluetooth transceivers, FM tuners, TV tuners, digital cameras, digital camcorders, or other devices that either produce, process or use audio, video signals or other data or communications.

In operation, the communication device includes one or more applications that include voice communications such as standard telephony applications, voice-over-Internet Protocol (VoIP) applications, local gaming, Internet gaming, email, instant messaging, multimedia messaging, web browsing, audio/video recording, audio/video playback, audio/video downloading, playing of streaming audio/video, office applications such as databases, spreadsheets, word processing, presentation creation and processing and other voice and data applications. In conjunction with these applications, the real-time data 26 includes voice, audio, video and multimedia applications including Internet gaming, etc. The non-real-time data 24 includes text messaging, email, web browsing, file uploading and downloading, etc.

In an embodiment of the present invention, the communication device 10 includes a circuit, such as a combined voice, data and RF integrated circuit having a diversity receiver that operates in accordance with one or more features or functions of the present invention. Such circuits shall be described in greater detail in association with FIGS. 3-9 that follow.

Figure 2:
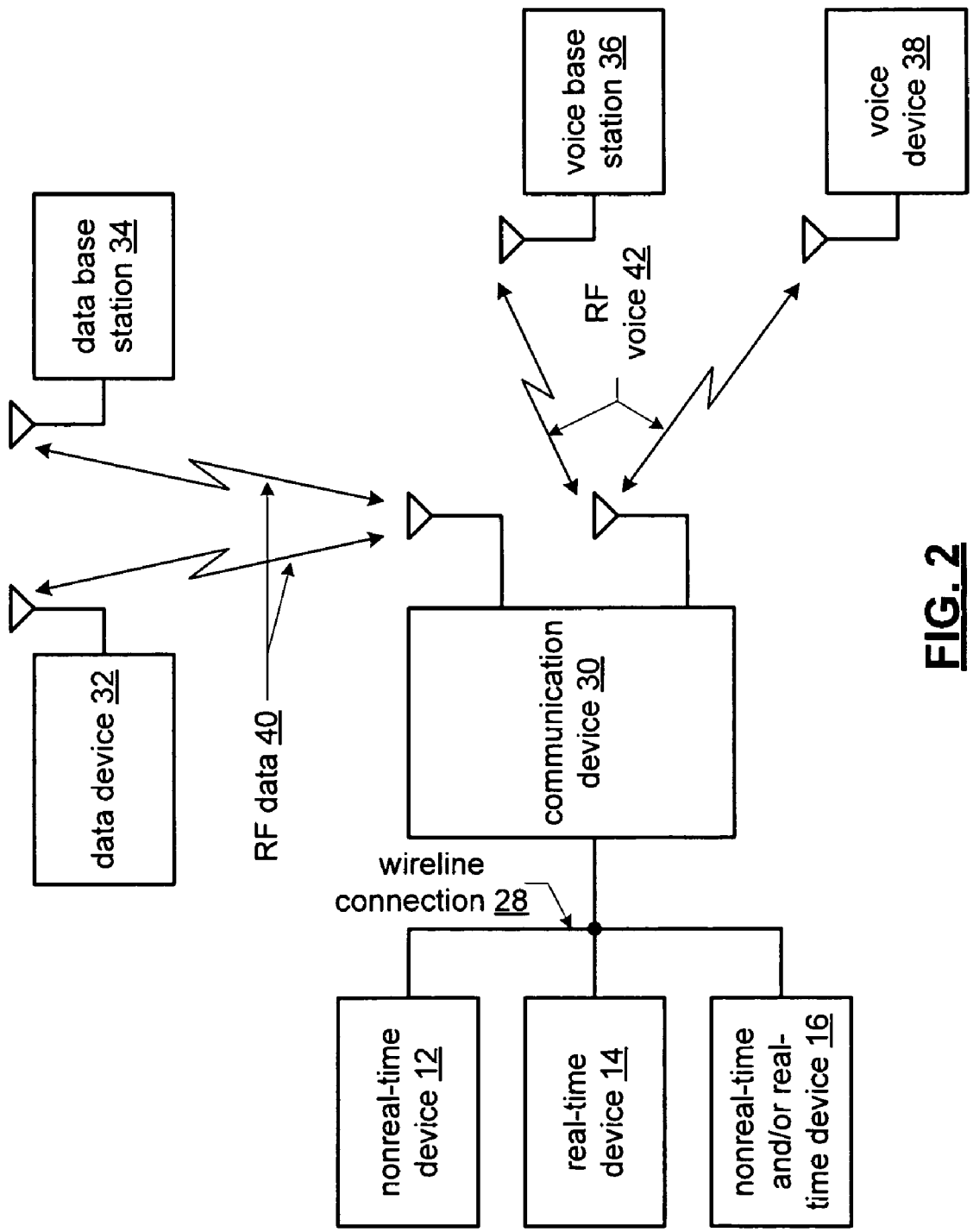
FIG. 2 is a schematic block diagram of a wireless communication system in accordance with the present invention.

FIG. 2 is a schematic block diagram of an embodiment of another communication system in accordance with the present invention. In particular, FIG. 2 presents a communication system that includes many common elements of FIG. 1 that are referred to by common reference numerals. Communication device 30 is similar to communication device 10 and is capable of any of the applications, functions and features attributed to communication device 10, as discussed in conjunction with FIG. 1. However, communication device 30 includes a wireless transceiver primarily for realtime communication and second wireless transceiver primarily for non-realtime communication. These two wireless transceivers can communicate, contemporaneously, via one or more wireless communication protocols with data device 32 and/or data base station 34 via RF data signal 40 and voice base station 36 and/or voice device 38 via RF voice signal 42. Either one or both of these two transceivers can include the diversity receiver in accordance with the present invention.

Figure 3:
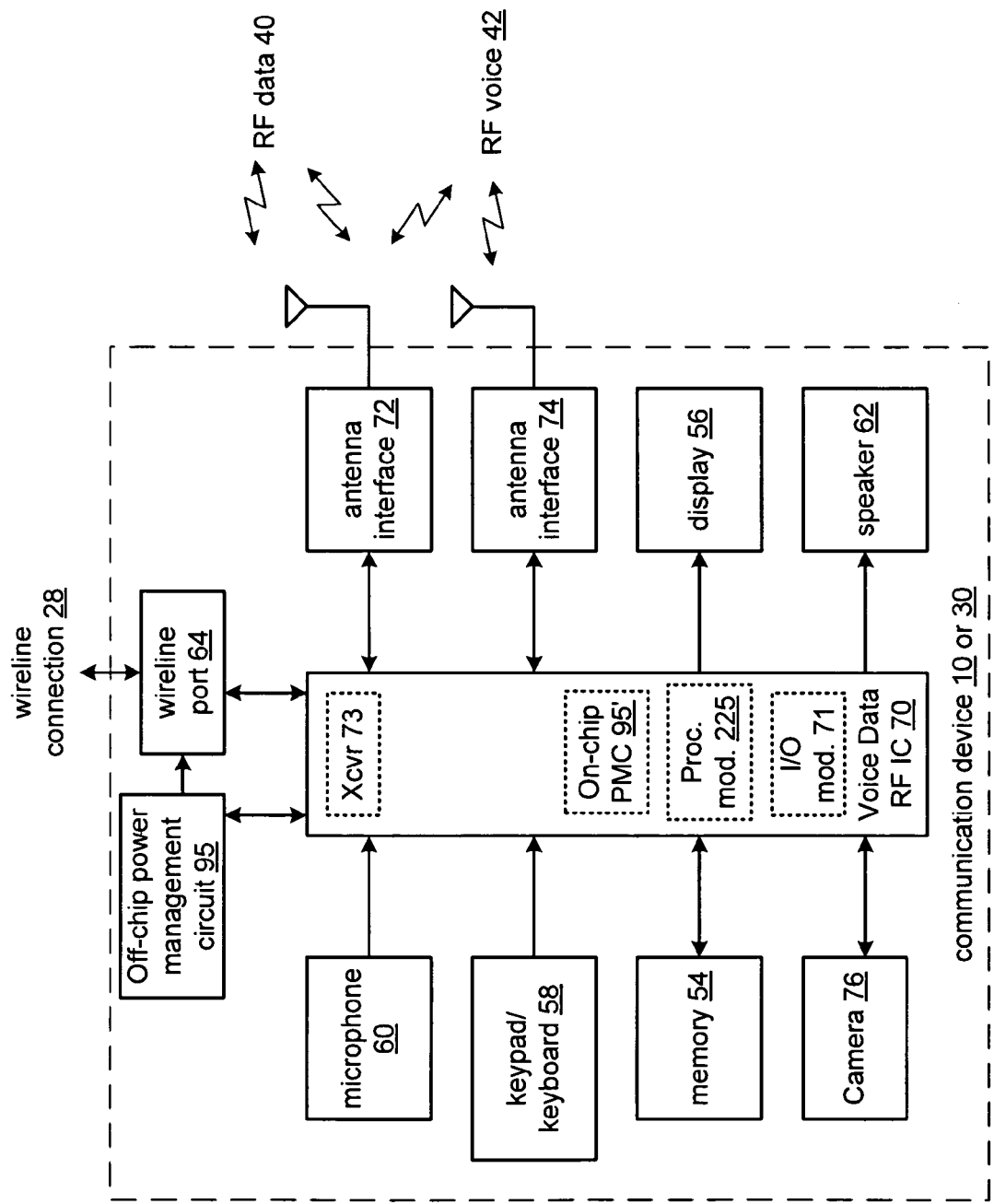
FIG. 3 is a schematic block diagram of a wireless communication device 30 in accordance with the present invention.

FIG. 3 is a schematic block diagram of an embodiment of an integrated circuit in accordance with the present invention. In particular, a voice data RF integrated circuit (IC) 70 is shown that implements communication device 10 or 30 in conjunction with microphone 60, keypad/keyboard 58, memory 54, speaker 62, display 56, camera 76, antenna interface 52 and wireline port 64. In addition, voice data RF IC 70 includes a transceiver 73 and optionally an additional transceiver 75 with RF and baseband modules for formatting and modulating data into RF real-time data 26 and non-real-time data 24 and transmitting this data and receiving similarly formatted data via an antenna interfaces 72 and 74 and attached antennas. In accordance with the present invention, one or both of the transceivers 73 and 75 include a diversity receiver and the corresponding antenna coupled to antenna interface 72 and/or 74 includes multiple antennas that are spaced apart to by an distance such as one-quarter wavelength or more of the lowest carrier frequency received by the receiver. In operation, this diversity receiver receives diverse signals over the same range of frequencies, such as from the same frequency channel and combines these diverse signals to increase the amplitude of a desired signal and to attenuate interference.

Further, voice data RF IC 70 includes an input/output module 71 with appropriate encoders and decoders for communicating via the wireline connection 28 via wireline port 64, an optional memory interface for communicating with off-chip memory 54, a codec for encoding voice signals from microphone 60 into digital voice signals, a keypad/keyboard interface for generating data from keypad/keyboard 58 in response to the actions of a user, a display driver for driving display 56, such as by rendering a color video signal, text, graphics, or other display data, and an audio driver such as an audio amplifier for driving speaker 62 and one or more other interfaces, such as for interfacing with the camera 76 or the other peripheral devices.

Off-chip power management circuit 95 includes one or more DC-DC converters, voltage regulators, current regulators or other power supplies for supplying the voice data RF IC 70 and optionally the other components of communication device 10 and/or its peripheral devices with supply voltages and or currents (collectively power supply signals) that may be required to power these devices. Off-chip power management circuit 95 can operate from one or more batteries, line power and/or from other power sources, not shown. In particular, off-chip power management module can selectively supply power supply signals of different voltages, currents or current limits or with adjustable voltages, currents or current limits in response to power mode signals received from the voice data RF IC 70. Voice Data RF IC 70 optionally includes an on-chip power management circuit 95' for replacing the off-chip power management circuit 95.

In an embodiment of the present invention, the voice data RF IC 70 is a system on a chip integrated circuit that includes at least one processing device. Such a processing device, for instance, processing module 225, may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The associated memory may be a single memory device or a plurality of memory devices that are either on-chip or off-chip such as memory 54. Such a memory device may be a read-only memory, random access memory, volatile memory, non-volatile memory, static memory, dynamic memory, flash memory, and/or any device that stores digital information. Note that when the Voice Data RF IC 70 implements one or more of its functions via a state machine, analog circuitry, digital circuitry, and/or logic circuitry, the associated memory storing the corresponding operational instructions for this circuitry is embedded with the circuitry comprising the state machine, analog circuitry, digital circuitry, and/or logic circuitry.

In operation, the voice data RF IC 70 executes operational instructions that implement one or more of the applications (real-time or non-real-time) attributed to communication devices 10 and/or 30 as discussed in conjunction with FIGS. 1 and 2. Further, RF IC 70 includes the interference attenuation features of the present invention, as will be discussed in greater detail in association with the description that follows.

Figure 4:
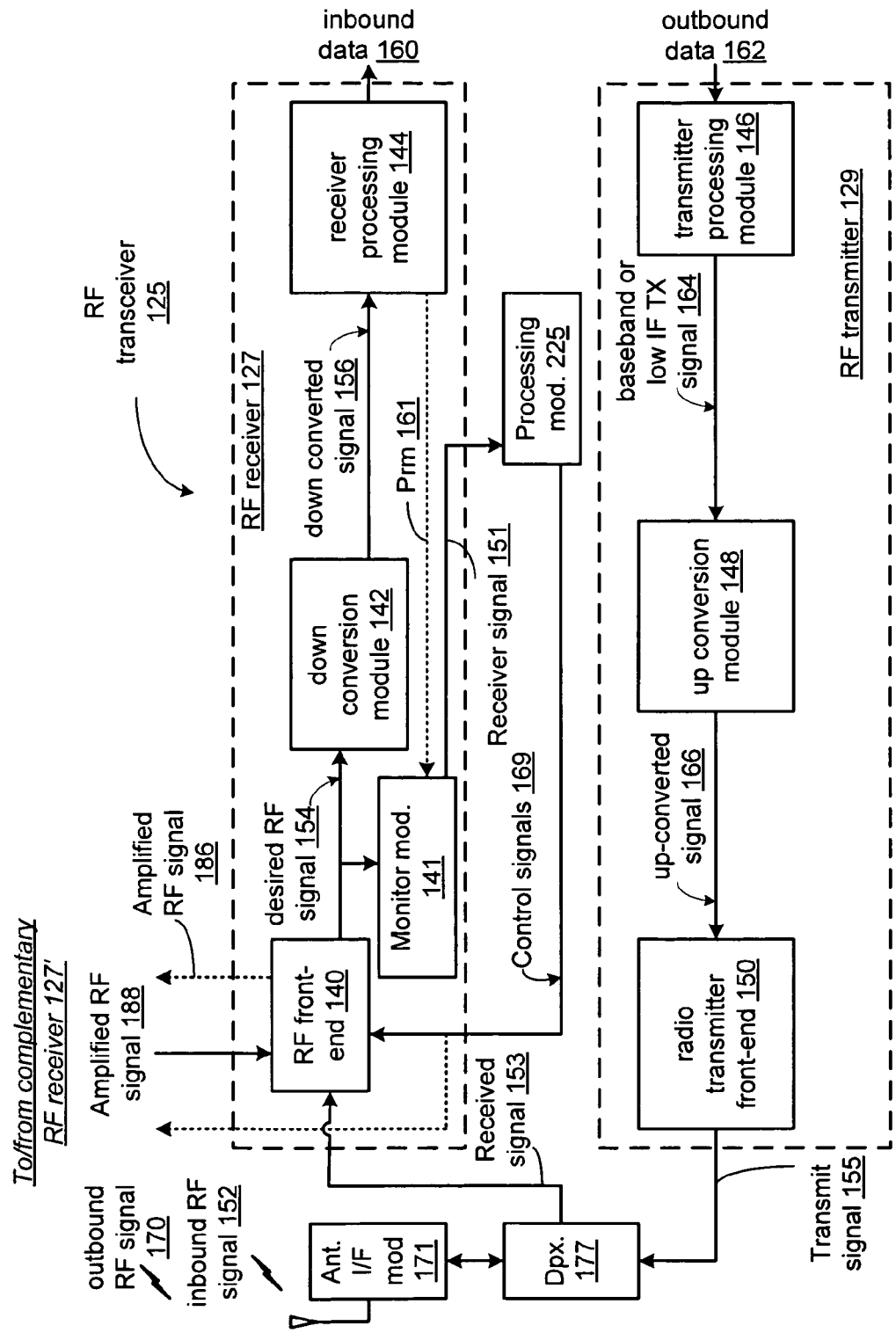
FIG. 4 is a schematic block diagram of an RF transceiver 125 in accordance with the present invention.

FIG. 4 is a schematic block diagram of an RF transceiver 125 in an embodiment of the present invention. In particular, transceiver 125 includes a portion of one of the transceivers 73 or 75, which may be incorporated in communication devices 10 and/or 30, provided however that only one RF receiver 127/RF front-end 140 is shown. In the diversity receiver configuration of the present invention, another complementary RF receiver 127' or simply an RF front end 140' is coupled thereto. The RF transceiver 125 includes an RF transmitter 129, an RF receiver 127 and a processing module 225. The RF receiver 127 includes a RF front end 140, a down conversion module 142, monitor module 141 and a receiver processing module 144. The RF transmitter 129 includes a transmitter processing module 146, an up conversion module 148, and a radio transmitter front-end 150.

As shown, the receiver and transmitter are each coupled to an antenna through an off-chip antenna interface 171 and a diplexer (duplexer) 177, that couples the transmit signal 155 to the antenna to produce outbound RF signal 170 and couples inbound signal 152 to produce received signal 153. While a single antenna is represented, the receiver and transmitter may each use separate antennas that each include one or more antennas Each of the antennas may be fixed, programmable, and antenna array or other antenna configuration. Further, the antenna structure of the wireless transceiver may depend on the particular standard(s) to which the wireless transceiver is compliant and the applications thereof.

In operation, the transmitter receives outbound data 162 from a host device or other source via the transmitter processing module 146. The transmitter processing module 146 processes the outbound data 162 in accordance with a particular wireless communication standard (e.g., IEEE 802.11, Bluetooth, RFID, GSM, CDMA, et cetera) to produce baseband or low intermediate frequency (IF) transmit (TX) signals 164. The baseband or low IF TX signals 164 may be digital baseband signals (e.g., have a zero IF) or digital low IF signals, where the low IF typically will be in a frequency range of one hundred kilohertz to a few megahertz. Note that the processing performed by the transmitter processing module 146 includes, but is not limited to, scrambling, encoding, puncturing, mapping, modulation, and/or digital baseband to IF conversion. Further note that the transmitter processing module 146 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 146 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

The up conversion module 148 includes a digital-to-analog conversion (DAC) module, a filtering and/or gain module, and a mixing section. The DAC module converts the baseband or low IF TX signals 164 from the digital domain to the analog domain. The filtering and/or gain module filters and/or adjusts the gain of the analog signals prior to providing it to the mixing section. The mixing section converts the analog baseband or low IF signals into up converted signals 166 based on a transmitter local oscillation.

The radio transmitter front end 150 includes a power amplifier and may also include a transmit filter module. The power amplifier amplifies the up converted signals 166 to produce outbound RF signals 170, which may be filtered by the transmitter filter module, if included. The antenna structure transmits the outbound RF signals 170 to a targeted device such as a RF tag, base station, an access point and/or another wireless communication device.

The receiver receives inbound RF signals 152 via the antenna through off-chip antenna interface 171 that operates to process the inbound RF signal 152 into received signal 153 for the receiver front-end 140. RF receiver 127, such as part of transceiver 73 operates in conjunction with an RF receiver 127' to cancel certain undesired signals, such as an interference signal that could adversely affect the performance of the RF receiver 127.

In operation, the RF receiver 127 and the complementary RF receiver 127' or RF receiver section 140' operate in the same frequency band or otherwise over the same range of frequencies that are received through their respective RF front-ends. An amplified RF signal 188 from the RF receiver 127' is provided to RF front-end 140. The desired signal component and undesired signal component received by RF front-end 140 can also be received by the RF front end 140' of RF receiver 127'. Amplified RF signal 188 can be used by RF front-end 140 to cancel or attenuate the undesired signal component while passing the desired signal component of received signal 173, under the control of processing module 225 via control signals 169. The RF receiver 127' optionally operates in a reciprocal fashion, based on amplified RF signal 186 from RF front-end 140 and control signals 169. The interoperation between these two receivers or receiver front-ends will be described in greater detail in conjunction with FIGS. 6 and 7 that follow.

The down conversion module 70 includes a mixing section, an analog to digital conversion (ADC) module, and may also include a filtering and/or gain module. The mixing section converts the desired RF signal 154 into a down converted signal 156 that is based on a receiver local oscillation, such as an analog baseband or low IF signal. The ADC module converts the analog baseband or low IF signal into a digital baseband or low IF signal. The filtering and/or gain module high pass and/or low pass filters the digital baseband or low IF signal to produce a baseband or low IF signal 156. Note that the ordering of the ADC module and filtering and/or gain module may be switched, such that the filtering and/or gain module is an analog module.

The receiver processing module 144 processes the baseband or low IF signal 156 in accordance with a particular wireless communication standard (e.g., IEEE 802.11, Bluetooth, RFID, GSM, CDMA, et cetera) to produce inbound data 160. The processing performed by the receiver processing module 144 includes, but is not limited to, digital intermediate frequency to baseband conversion, demodulation, demapping, depuncturing, decoding, and/or descrambling. Note that the receiver processing modules 144 may be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the receiver processing module 144 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, processing module 225 generates the control signals 169 in response to receiver signal 151 that includes a receiver performance parameter generated by monitor module 141, such as a signal to noise ratio (SNR), signal to interference and noise ratio (SINR) in response to properties of desired signal 154, and optionally parameter 161, such as BER and/or other performance parameters generated by receiver processing module 144. Processing module 225 generates control signals 169 to increase the amplitude of the desired signal component while controlling the cancellation and or attenuation of the undesired signal component performed by the RF receiver 127 and optionally the RF receiver 127'. In one mode of operation, the processing module 225 is preprogrammed with the particular control signals 169 so that logic or other circuitry or programming, such as via a look-up table, can be used to retrieve the particular control signals required for the particular values of the receiver signal 151. In a further mode of operation, the processing module 225 iteratively tunes or utilizes feedback control techniques such as optimal control, linear quadratic regulator, proportional integral derivative (PID) control or other control techniques to minimize or attenuate the undesired signal component, maximize the amplitude of the desired signal component, maximize the signal to noise ratio or other to optimize another receiver performance parameter.

In an embodiment of the present invention, processing module 225 performs various processing steps to implement the functions and features described herein. Such a processing module can be implemented using a shared processing device, individual processing devices, or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when the processing module 225 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

Figure 5:
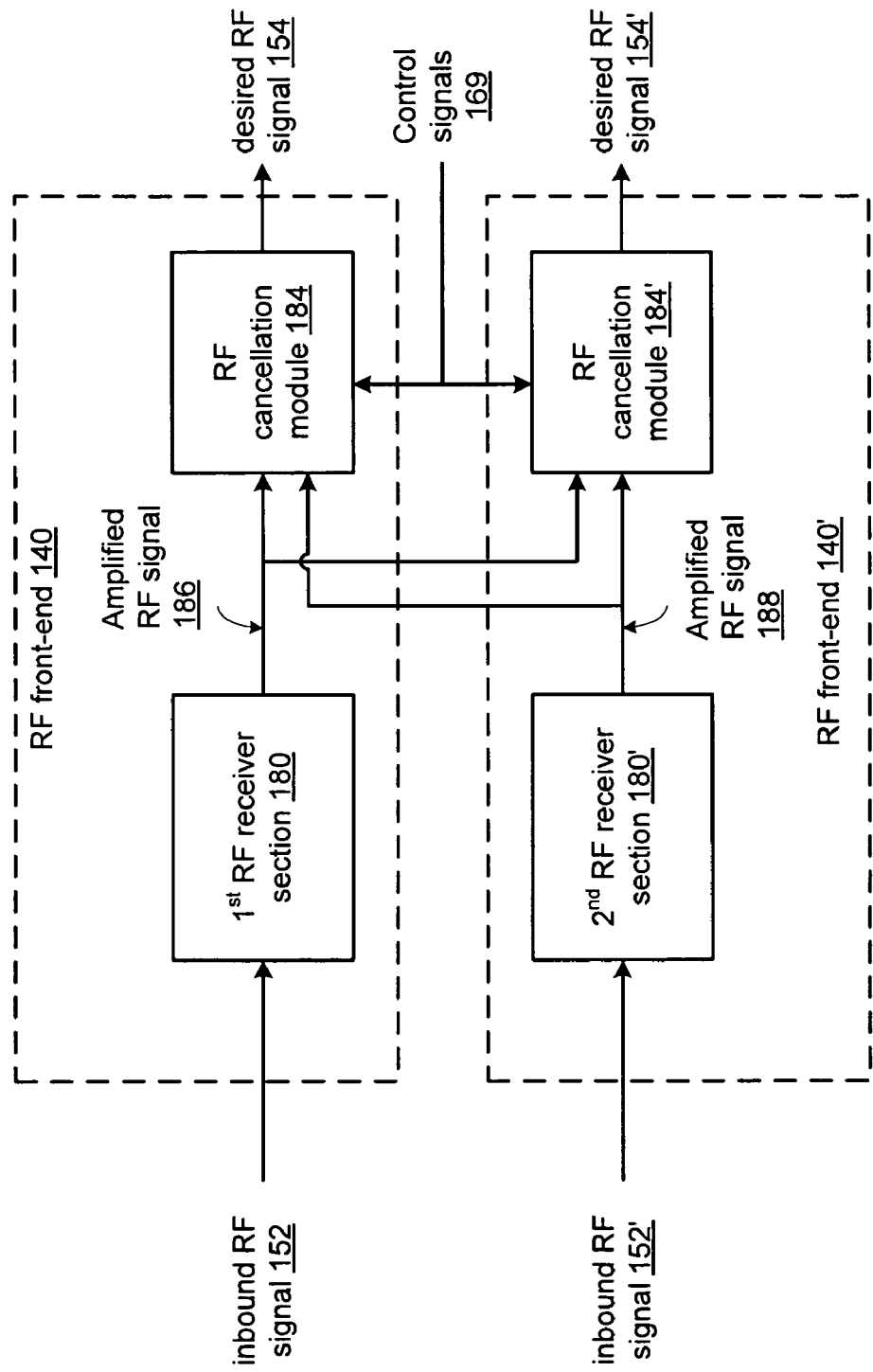
FIG. 5 is a schematic block diagram of RF front-ends 140 and 140' in accordance with an embodiment of the present invention.

FIG. 5 is a schematic block diagram of RF front-ends 140 and 140' in accordance with an embodiment of the present invention. In particular, a first radio frequency (RF) receiver section 180 of RF front-end 140/RF receiver 127 is coupled to receive an inbound RF signal 152 over a range of frequencies that includes a desired RF signal component and an undesired signal component. In an embodiment of the present invention the first RF receiver section 180 includes a low noise amplifier that generates an amplified RF signal 186. A second RF receiver section 180' of RF front-end 140'/RF receiver 127' is coupled to receive an inbound RF signal 152' over the range of frequencies, the inbound RF signal 152' including the undesired signal component, and the desired signal component at different amplitudes and phases that the undesired and desired components than the inbound RF signal 152. In an embodiment of the present invention the second RF receiver section 180' also includes a low noise amplifier that generates a second amplified RF signal.

RF cancellation module 184 operates under command of the control signals 169 to provide the desired RF signal 154 while attenuating or canceling the undesired signal. In this embodiment, RF front-end 140' also includes an RF cancellation module 184' for providing its own desired RF signal 154' while attenuating or canceling an undesired signal component using the amplified RF signal 186 from RF front-end 140. Further details regarding an embodiment of RF cancellation modules 184 and 184' are presented in conjunction with FIG. 6.

Figure 6:
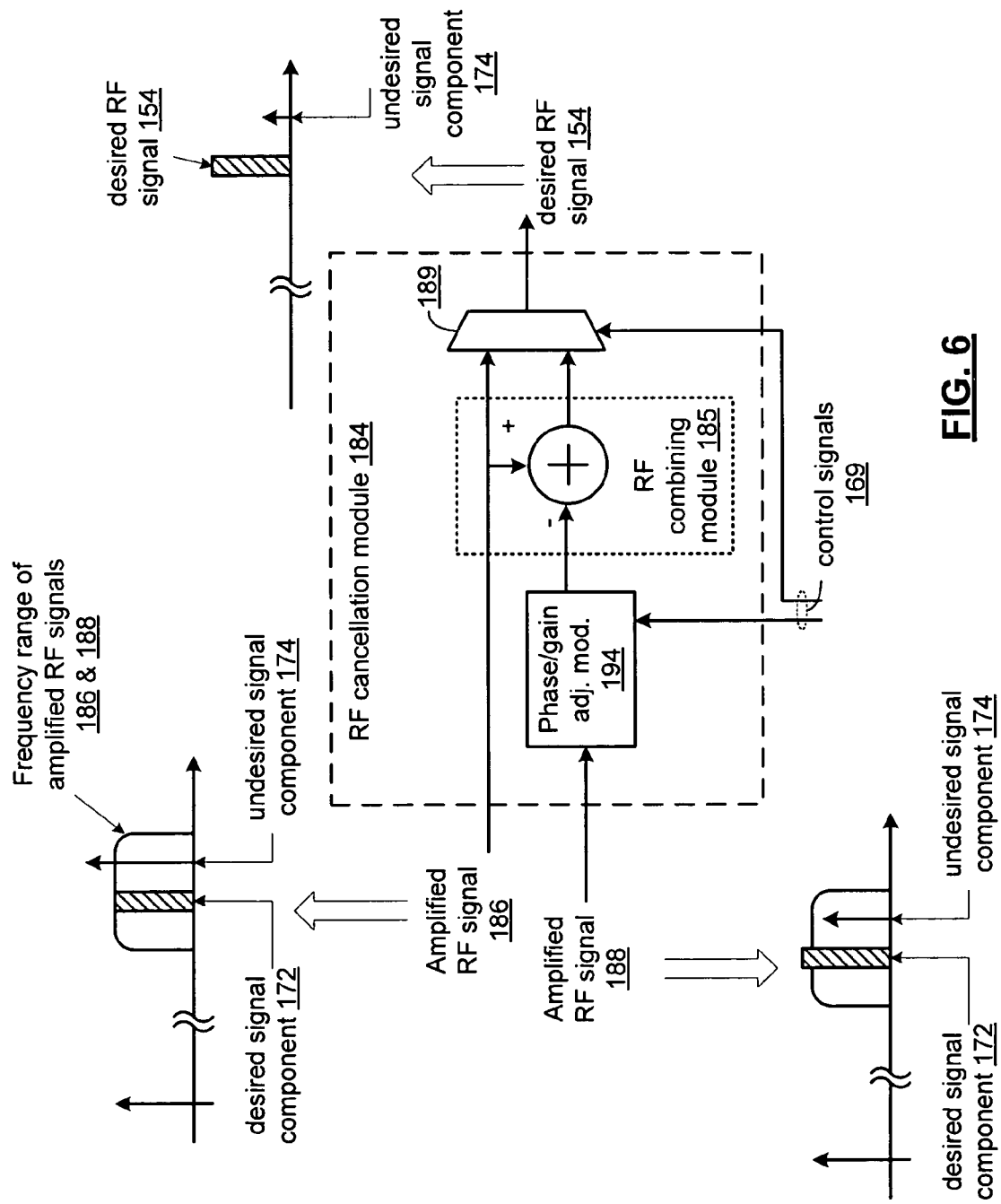
FIG. 6 is a schematic block diagram of an RF cancellation module 184 in accordance with a further embodiment of the present invention.

FIG. 6 is a schematic block diagram of an RF cancellation module 184 in accordance with a further embodiment of the present invention. In particular, RF cancellation module 184 includes a phase/gain adjustment module that adjusts the gain and phase of the second inbound RF signal, in response to one or more of the control signals 169 to produce an adjusted signal. In an embodiment of the present invention, processor 225 generates the one or more control signals 169 based on feedback gathered by monitor module 141 regarding values of one or more performance parameters such as signal to noise ratio, signal to interference and noise ratio, signal to interference ratio, BER, etc. to control the phase/gain adjustment to match, as closely as practical, the amplitude and phase of the undesired signal component 174 recovered from amplified RF signal 188 with the amplitude and phase of the undesired signal component 174 recovered from amplified RF signal 186, to maximize the amplitude of the desired signal component and/or to otherwise optimize a receiver performance parameter.

RF combining module 185 produces a combined signal by combining the amplified RF signal 186 with the adjusted signal. Multiplexer 189 selects in response to one or more control signals 169, the desired RF signal as either the amplified RF signal 186 or the combined signal. In operation, the processing module 225 can determine based on the performance parameters whether an interference signal is present in sufficient magnitudes to require correction, if not, then processing module 225 can command the multiplexer 189 to select the desired RF signal 154 as the amplified RF signal 186. In the presence of significant interference, processing module 225 can command the multiplexer 189 to select the combined signal from RF combining module 185 and to command the phase/gain module 194 to improve the value of the performance parameter of the desired signal 154. If unsuccessful or unneeded, the processing module 225 can command the multiplexer 189 to revert back to the amplified RF signal 186 as the source of desired RF signal 154.

While not expressly shown, RF cancellation module 184 can operate in a similar fashion to RF cancellation module 184' to produce a desired RF signal 154' based on amplified RF signals 186 and 188 under command of additional control signals 169.

Figure 7:
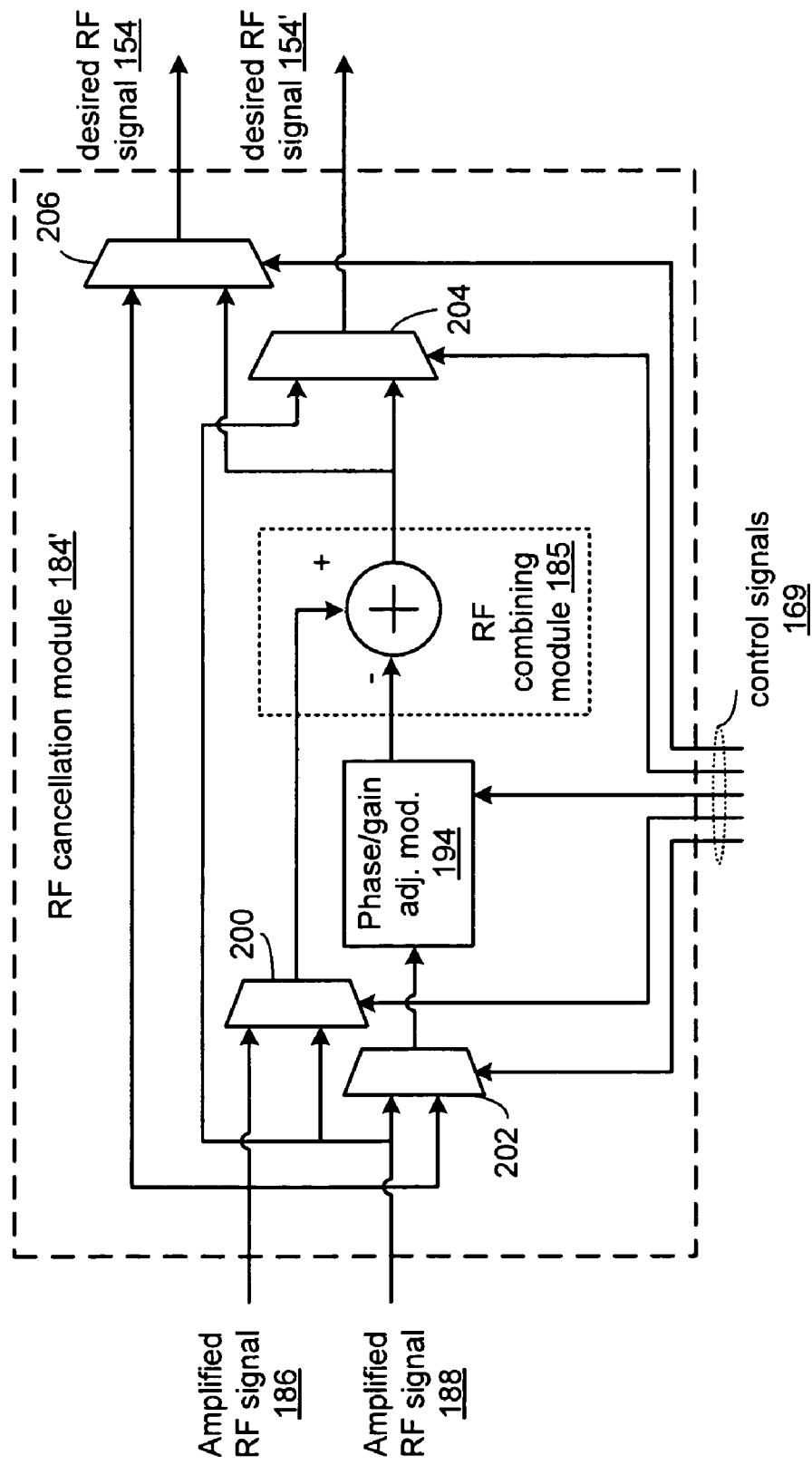
FIG. 7 is a schematic block diagram of an RF cancellation module 184' in accordance with a further embodiment of the present invention.

FIG. 7 is a schematic block diagram of an RF cancellation module 184' in accordance with a further embodiment of the present invention. In this embodiment, a single RF cancellation module 184' operates under control of control signals 169 from processing module 225 to operate in a first mode to either attenuate an undesired signal component from amplified RF signal 186 based on amplified RF signal 188, or in a second mode to attenuate an undesired signal component from amplified RF signal 188 based on amplified RF signal 186. In the first mode, the multiplexer 200 passes amplified RF signal 186, multiplexers 202 and 204 pass amplified RF signal 188, and multiplexer 206 passes the output of RF combining module 185. In the second mode, the multiplexer 200 passes amplified RF signal 188, multiplexers 202 and 206 pass amplified RF signal 186, and multiplexer 204 passes the output of RF combining module 185. RF cancellation module otherwise operates in a similar fashion to RF cancellation module 184. In an embodiment of the present invention, the processing module 225 can select either the first mode or the second mode based on the presence of possible undesired signal components received by the corresponding RF receiver detected by performance parameters from each receiver, based on which RF receiver has greater interference or based on which undesired signal component can more effectively be attenuated by the RF cancellation module 184', etc.

Figure 8:
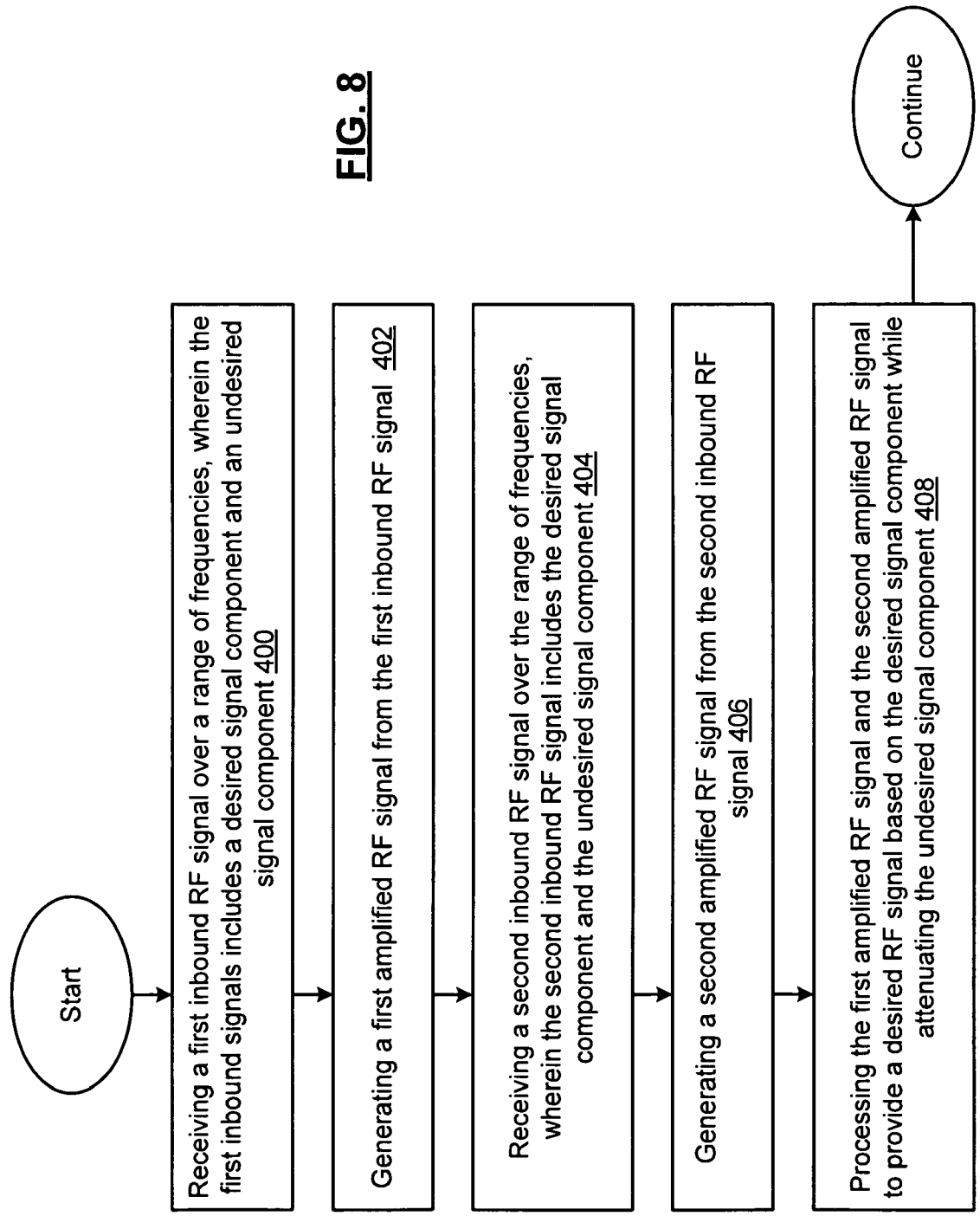
FIG. 8 is a flowchart representation of a method in accordance with an embodiment of the present invention.

FIG. 8 is a flowchart representation of a method in accordance with an embodiment of the present invention. In particular a method is presented for use with one or more features or functions presented in conjunction with FIGS. 1-7. In step 400, a first inbound RF signal is received over a range of frequencies, wherein the first inbound RF signal includes a desired RF signal component and an undesired signal component. In step 402, a first amplified RF signal is generated from the first inbound RF signal. In step 404, a second inbound RF signal is received over the range of frequencies, wherein the second inbound RF signal further includes the desired signal component and the undesired signal component. In step 406, a second amplified RF signal is generated from the second inbound RF signal. In step 408, the first amplified RF signal and the second amplified RF signal are processed to provide a desired RF signal based on the desired signal component while attenuating the undesired signal component.

In an embodiment of the present invention, step 408 further includes selecting in response to a second control signal, the desired RF signal as one of, the first amplified RF signal, and the combined signal. In addition, step 408 can include generating the second control signal based on the performance parameter. Further, step 408 can also include adjusting the gain and phase of the second inbound RF signal, in response to a first control signal, to produce an adjusted signal, and producing a combined signal that includes the desired signal and attenuates the undesired signal by combining the first inbound RF signal with the adjusted signal.

Figure 9:
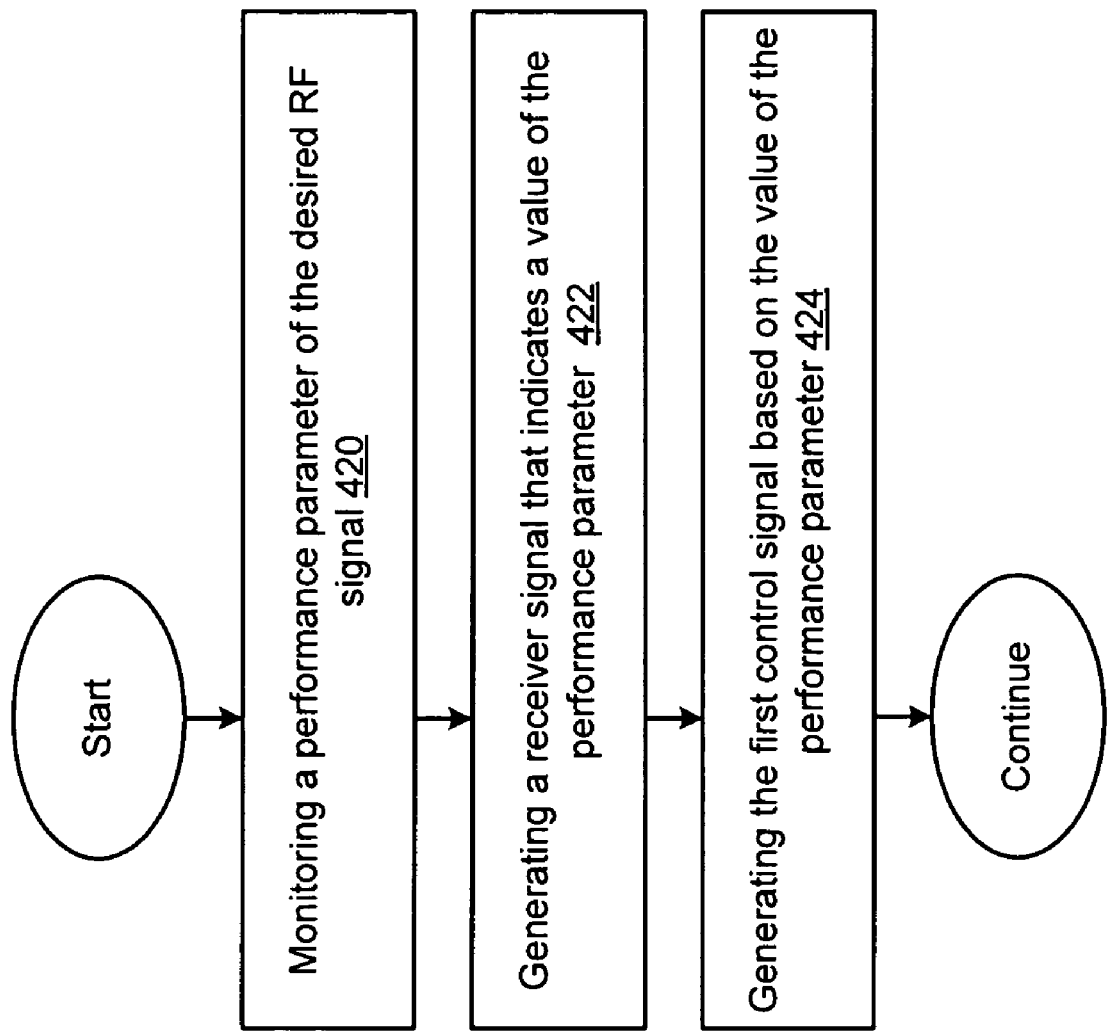
FIG. 9 is a flowchart representation of a method in accordance with an embodiment of the present invention.

FIG. 9 is a flowchart representation of a method in accordance with an embodiment of the present invention. In particular, a method is presented for use with one or more features or functions presented in conjunction with FIG. 8 when step 408 includes adjusting the gain and phase of the second inbound RF signal, in response to a first control signal, to produce an adjusted signal, and producing a combined signal that includes the desired signal and attenuates the undesired signal by combining the first inbound RF signal with the adjusted signal. In step 420, a performance parameter of the desired RF signal is monitored. In step 422, a receiver signal is generated that indicates a value of the performance parameter. In step 424, the first control signal is generated based on the value of the performance parameter.

In an embodiment of the present invention, the performance parameter includes one of, a signal to noise ratio, a signal to interference ratio, and a bit error rate.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors discussed above may be field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A voice, data and RF integrated circuit (IC) for use in a diversity receiver, the voice, data and RF IC comprising:
   a first radio frequency (RF) receiver section coupled to receive a first inbound RF signal over a range of frequencies and generate a first amplified RF signal, wherein the first inbound RF signal includes a desired RF signal component and an undesired signal component;
   a second RF receiver section coupled to receive a second inbound RF signal over the range of frequencies and generate a second amplified RF signal, wherein the second inbound RF signal includes the desired signal component and the undesired signal component; and
   a first RF cancellation module, coupled to the first RF receiver section and the second RF receiver section, that provides a desired RF signal from the desired RF signal component while attenuating the undesired signal component, based on the first amplified RF signal and the second amplified RF signal, wherein the first RF cancellation module includes:
      a phase/gain adjustment module that adjusts the gain and phase of the second amplified RF signal, in response to a first control signal, to produce an adjusted signal; and
      a RF combining module that combining the first amplified RF signal with the adjusted signal to produce a combined signal.

2. The voice, data and RF IC of claim 1 further comprising:
   a monitor module, coupled to the first RF receiver section, that monitors a performance parameter of the desired RF signal and generates a receiver signal that indicates a value of the performance parameter; and
   a processing module, coupled to the first RF cancellation module and the monitor module, that generates the first control signal based on the value of the performance parameter.

3. The voice, data and RF IC of claim 2 wherein the performance parameter includes one of, a signal to noise ratio, a signal to interference ratio, a signal to noise and interference ratio and a bit error rate.

4. The voice, data and RF IC of claim 2 wherein the first RF cancellation module further includes a multiplexer for selecting in response to a second control signal the desired RF signal as one of, the first amplified RF signal, and the combined signal.

5. The voice, data and RF IC of claim 4 wherein the processing module generates the second control signal based on the performance parameter.

6. The voice, data and RF IC of claim 1 further comprising:
   a second RF cancellation module, coupled to the first RF receiver section and the second RF receiver section, that selectively provides the desired RF signal while attenuating the undesired signal, in response to at least one control signal.

7. A diversity receiver comprising:
   a first radio frequency (RF) receiver section coupled to receive a first inbound RF signal and generate a first amplified RF signal, wherein the first inbound RF signal includes a desired RF signal component and an undesired signal component;
   a second RF receiver section coupled to receive a second inbound RF signal and generate a second amplified RF signal, wherein the second inbound RF signal includes the desired RF signal component and the undesired signal component; and
   a first RF cancellation module, coupled to the first RF receiver section and the second RF receiver section, that provides a desired RF signal from the desired RF signal component while attenuating the undesired signal component, wherein the first RF cancellation module includes:
      a phase/gain adjustment module that adjusts the gain and phase of the second amplified RF signal, in response to a first control signal, to produce an adjusted signal; and a RF combining module that combining the first amplified RF signal with the adjusted signal to produce the desired RF signal;

wherein the first RF receiver section receives the first inbound RF signal over a range of frequencies, the second RF receiver section receives the second inbound RF signal over the range of frequencies.

8. The diversity receiver of claim 7 further comprising:
a monitor module, coupled to the first RF receiver section, that monitors a performance parameter of the desired RF signal and generates a receiver signal that indicates a value of the performance parameter; and
a processing module, coupled to the first RF cancellation module and the monitor module, that generates the first control signal based on the value of the performance parameter.

9. The diversity receiver of claim 8 wherein the performance parameter includes one of, a signal to noise ratio, a signal to interference ratio, a signal to noise and interference ratio and a bit error rate.

10. The diversity receiver of claim 8 wherein the first RF cancellation module further includes a multiplexer for selecting in response to a second control signal the desired RF signal as one of, the first amplified RF signal, and a combined signal from the RF combining module.

11. The diversity receiver of claim 10 wherein the processing module generates the second control signal based on the performance parameter.

12. The diversity receiver of claim 7 further comprising:
a second RF cancellation module, coupled to the first RF receiver section and the second RF receiver section, that selectively provides the desired RF signal while attenuating the undesired signal, in response to at least one control signal.

13. A method for use in a voice, data and RF integrated circuit (IC), the method comprising:
receiving a first inbound RF signal over a range of frequencies, wherein the first inbound RF signal includes a desired RF signal component and an undesired signal component;
generating a first amplified RF signal from the first inbound RF signal;
receiving a second inbound RF signal over the range of frequencies, wherein the second inbound RF signal includes the desired RF signal component and the undesired signal component;
generating a second amplified RF signal from the second inbound RF signal; and
processing the first amplified RF signal and the second amplified RF signal to provide a desired RF signal based on the desired signal component while attenuating the undesired signal component, wherein the processing includes:
adjusting the gain and phase of the second inbound RF signal, in response to a first control signal, to produce an adjusted signal; and
producing a combined signal that includes the desired signal and attenuates the undesired signal by combining the first inbound RF signal with the adjusted signal.

14. The method of claim 13 further comprising:
monitoring a performance parameter of the desired RF signal;
generating a receiver signal that indicates a value of the performance parameter; and
generating the first control signal based on the value of the performance parameter.

15. The method of claim 14 wherein the performance parameter includes one of, a signal to noise ratio, a signal to interference ratio, a signal to noise and interference ratio and a bit error rate.

16. The method of claim 13 wherein the step of processing further includes:
selecting in response to a second control signal, the desired RF signal as one of, the first amplified RF signal, and the combined signal.

17. The method of claim 13 wherein the step of processing further includes:
generating the second control signal based on the performance parameter.

* * * * *

UNITED STATES PATENT AND TRADEMARK OFFICE
CERTIFICATE OF CORRECTION

PATENT NO. : 7,949,366 B2
APPLICATION NO. : 11/947018
DATED : May 24, 2011
INVENTOR(S) : Ahmadreza Rofougaran It is certified that error appears in the above-identified patent and that said Letters Patent is hereby corrected as shown below:

Col. 13, line 1, in claim 7: replace "module that combining" with --module that combines--

Signed and Sealed this
Thirtieth Day of October, 2012

David J. Kappos
*Director of the United States Patent and Trademark Office*